Nov. 22, 1955 R. H. ANDERSON ET AL 2,724,284
MULTIPLE LEAD ANTIFRICTION SCREW DEVICES
Filed Oct. 1, 1954
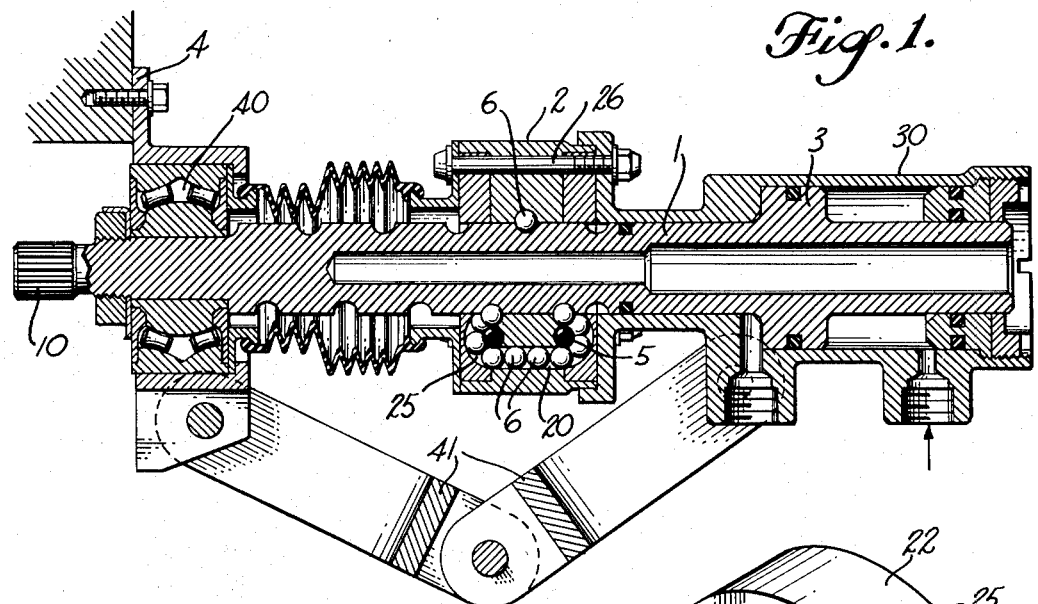
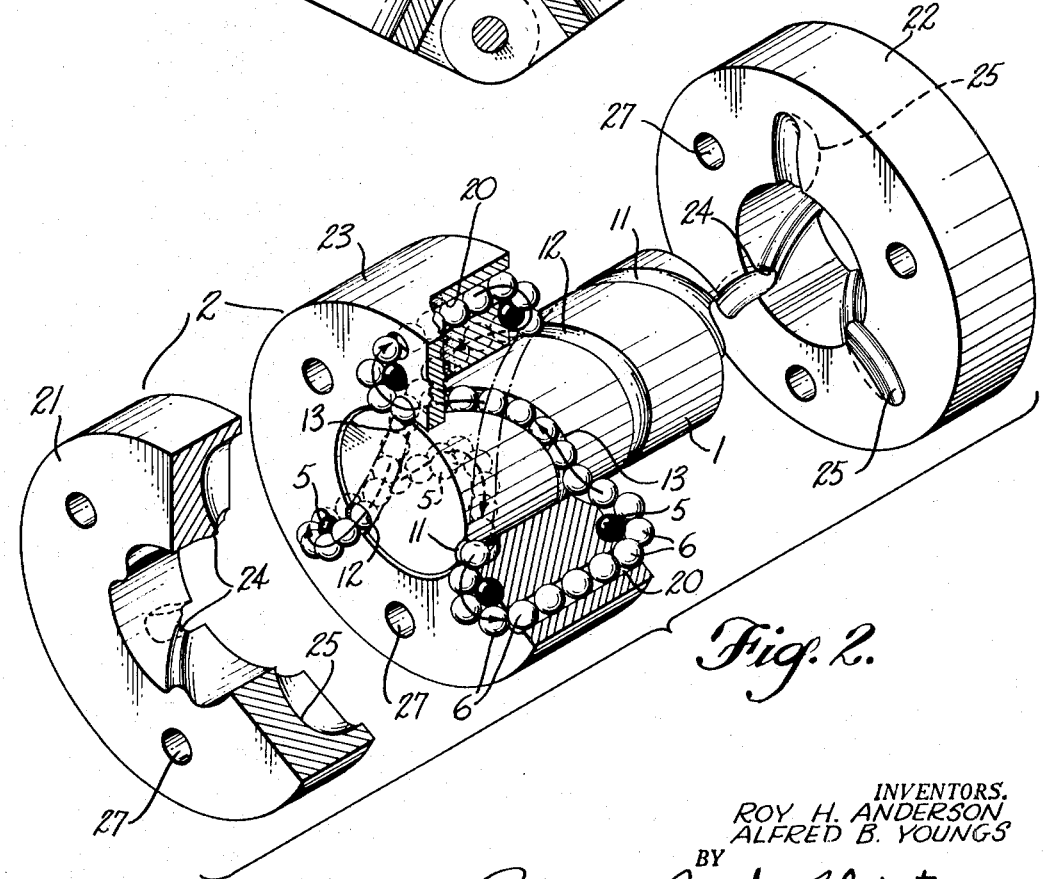
INVENTORS.
ROY H. ANDERSON
ALFRED B. YOUNGS
BY
Reynolds, Beach + Christensen
ATTORNEYS

United States Patent Office 2,724,284
Patented Nov. 22, 1955

2,724,284

MULTIPLE LEAD ANTIFRICTION SCREW DEVICES

Roy H. Anderson, Bellevue, and Alfred B. Youngs, Seattle, Wash., assignors to Boeing Airplane Company, Seattle, Wash., a corporation of Delaware Application October 1, 1954, Serial No. 459,763

7 Claims. (Cl. 74—459)

Anti-friction screw devices are known and used in various locations. The several Hoffar Patents No. 2,298,011 of October 6, 1942, No. 2,343,507 of March 7, 1944, and No. 2,404,378 of July 23, 1946, are examples. Such anti-friction screw devices as heretofore proposed and made are, so far as we are aware, single lead screws, consisting of several complete (360°) turns of the screw, and a short, straight return duct for the balls directed in the axial direction. In consequence, their rate of axial advance is somewhat limited, and their ability to transmit torque from the screw to the nut, or vice versa, is likewise quite limited because of their low pitch.

There are occasions where such anti-friction screw devices are needed to effect limited rotational movement and limited relative axial movement, but to effect such movement at a higher rate than is conveniently possible with the single thread, low pitch, anti-friction screw devices of the prior art. For such purposes, the use of a multiple thread, high pitch screw device is indicated.

In attempting to procure or to manufacture such a multiple thread, high pitch, anti-friction screw device, it was discovered that very great, possibly insurmountable, difficulties arose, because of the inability to guide the balls from the one end of each thread in the nut back to the opposite end of that same thread. Each such thread had limited axial extent, and consequently an angular extent much less than 360°, yet great enough that the conformation of a return duct was quite curved and complex. For example, a three-thread screw member of this type might have the ends of its individual threads in the nut displaced angularly by 120°, and unless the length of the nut is sufficient to accomplish a 360° turn, which ordinarily it would not be, the ball return duct could not be straight, and axially disposed. In consequence, in attempting to recirculate the balls in each individual screw thread in the nut, it was required that the balls be caused to traverse a return duct which was itself long and helically disposed, and within which there was no force other than the force of the balls behind pushing to effect movement of the returning balls so that they might re-enter the same thread.

Even could this difficulty have been overcome, a further and very substantial difficulty lay in the intricate machine work necessary to reverse the axial direction of the balls at each end of its helical groove, so that it might exit from or enter the helical return duct. The difficulty and expense of making so intricate a ball return groove made the cost of the screw device rather prohibitive in the multiple-lead form.

It is the aim of the present invention to simplify the construction and to avoid the difficulties and expense indicated, and more particularly to do so by recirculating the balls not each within its individual helical groove and helical return duct, but rather to recirculate the balls through successive helical ducts and through return ducts which join the terminus of one helical groove to the beginning, or terminus, of a different helical groove, and so on around until the same balls are circulated through all the helical grooves in succession, and through intervening short, straight, axially directed return ducts.

By so doing, the machining of the nut and the ball duct is greatly simplified. By dividing the nut into three parts, namely, two end caps and an intervening collar, the return ducts in the collar may be formed as simple, straight bores in the axial direction, and the reversing portion of each such duct at each end thereof can be formed by a simple milling operation in the respective end caps. As a result, the cost of such screw devices with multiple threads is greatly reduced, their accuracy is improved, and they are thus made available in many instances where otherwise it would be impracticable to use them.

In addition, by the construction just described and by the simple addition of stationary pivot balls in each reversing portion of the circulating duct, the machining of the assembly is further simplified and wear is reduced.

The invention is shown in the accompanying drawings in somewhat simplified fashion, and in a typical installation, and the principles of the invention will be better understood as this specification progresses and from the accompanying claims, taken in conjunction with the drawings to which reference is made herein.

Figure 1 is a general axial sectional view of an installation employing such a multiple thread high pitch, anti-friction screw device.

Figure 2 is an isometric view, partly in phantom and partly exploded, to illustrate more clearly the underlying principle of the present invention.

Referring, first, briefly to Figure 1, a screw member 1 cooperates with a nut generally designated by the numeral 2 through the intervention of circular balls 6, to be described more fully hereinafter, to effect rotation of the screw member 1 while the nut 2 is stationary, under the influence of a force supplied axially of the screw member 1 through a plunger 3 within a cylinder 30, and subject to fluid pressure. By mounting the screw member 1 in anti-friction radial and thrust bearings, as indicated at 40, and fixedly supported at 4, and by providing the articulated toggle arms 41 connecting the support 4 and the cylinder 30, the arrangement will effect limited relative axial movement of the parts, and will at the same time rotate the screw member 1 by a limited angular amount, which rotation may be transmitted to any suitable member through the splined end 10 of the screw member. The arrangement is merely chosen for illustration, and the particular arrangement does not of itself constitute part of this invention. It does illustrate, however, a situation where limited and, in this instance, quite exact angular rotation is required, and is accomplished by limited relative axial movement of the screw member and nut.

The screw member, as is best seen in the somewhat simplified form of Figure 2, is provided with three helical grooves of high pitch, designated to distinguish them 11, 12 and 13. The cooperating nut 2 is preferably formed in three parts, namely, the two end caps 21 and 22, respectively, and the intervening collar 23. The collar is formed with three grooves which are precisely complemental to the respective grooves 11, 12 and 13 of the screw member. This is similar to the Hoffar type screw devices wherein the nut, although of a single lead only, has a groove which is precisely complemental to the single-lead groove of the screw member. The difference in the present invention is that there are three such grooves, which, to the extent so far described, are completely independent.

In accordance with the present invention, return means are provided whereby balls which exit at one end from the groove 11, for example, will at the opposite end of the nut enter the groove 13, those balls upon exiting from the groove 13 will return and enter at the opposite end of the groove 12, and upon reaching the far end of the groove 12 will return and enter once more that end of the groove 11 which is opposite its exit end. This circulation of the balls is indicated by the arrows in Figure 2.

In order to accomplish this recirculation, and in order to do so without extremely intricate forming or machining operations, the reversing portion of each ball's path is formed wholly and completely in the end cap 22, and the portion of the ball's circulating path which is in the collar 23 can very conveniently and preferably be formed as a simple, straight, short, axially directed bore 20, in each instance.

Each end cap is preferably formed with a plow, such as is indicated at 24, projecting inwardly in continuation of the several grooves 11, 12 and 13, but not necessarily in contact with the wall of the groove. Nevertheless, it will serve to initiate extraction of each successive ball 6 from the groove, and to start it on its way through the reversing path. The reversing path is formed by a generally semicircular, milled cut 25 in the inner end face of each cap, such as may be made by a small milling cutter of rounded contour, cutting in a plane, but in a plane canted at an angle to the axis of the end cap. Thus, when the end caps are assembled with the collar 23 and are held by the bolts 26 received in the aligned holes 27, the semi-circular cuts 25 connect, for example, an end of a straight return bore 20 with the helical groove 13 and the complemental groove in the nut.

Without more, however, the balls would tend to pile up in the semicircular cuts 25 because of excess space therein. To fill this space and to provide a pivot or center about which the balls may turn, applicants install pivot balls 5 at the center of each such straight groove 25. This may be installed by forming a depression, properly located, in each end of the collar at the proper location, as is best seen in Figure 2. The circulating balls 6 are employed to whatever number is necessary to completely fill the closed circuit thus constituted. All may be of one size, for in such a high pitch screw, it has been found unnecessary to employ the Hoffar principle of alternate large and small balls. They constitute an effective means for transmitting torque between the screw member 1 and the nut 2, and for effecting rotation of the one with respect to the other which is stationary. These circulating balls 6, as has been indicated above, circulate endlessly through the closed circuit, consisting of the successive grooves 11, 12 and 13, or those portions thereof which are within the nut, and the return straight portions 20 and curved portions 25 of the return ducts, as the latter are restricted by the pivot balls 5.

We claim as our invention:

1. An antifriction screw device of the character described, comprising a screw member formed with multiple, high pitch helical grooves, a nut encircling said screw member and having helical grooves complemental to the respective grooves of the screw member, and movable axially relative to the screw member, said nut having a ball return duct leading from each terminus of each groove to the terminus, at the nut's axially opposite end, of a different groove, to define collectively a closed circuit including in succession a first groove, the return duct to a second groove, the second groove itself, the return duct to a further groove, continuing in the same alternation and succession, ending with the return duct to the first groove, and a plurality of balls interengaged between the screw member and the nut, in the several helical grooves thereof, and also filling the several return ducts, and circulating endlessly through the closed circuit as the nut and the screw member are moved relatively axially and rotatively.

2. An antifriction screw device of the character defined in claim 1, wherein the nut is formed of two end caps and an intervening collar, the portion of each return duct which lies within the collar being substantially straight and axially disposed, and each end cap being formed with substantially semicircular grooves each joining the end of such a straight portion with the entrance to a helical groove between the nut and the screw member.

3. An antifriction screw device of the character defined in claim 2, characterized in that the semicircular grooves in the end caps are generally planar, but canted relative to the axis of rotation.

4. An antifriction screw device of the character defined in claim 2, wherein each end cap is formed with a plow, received within the screw member's helical groove, at each junction of its semicircular groove with other grooves, to guide the balls circulating within the semicircular grooves from and into such other grooves.

5. An antifriction screw device of the character defined in claim 2, including a stationary pivot ball installed at the center of each end cap groove, as a center about which the circulating balls turn in their movement through that end cap groove.

6. An antifriction screw device of the character defined in claim 5, wherein the collar, at the center of each end cap groove, is indented to locate and retain the corresponding pivot ball.

7. An antifriction screw device of the character defined in claim 2, wherein the grooves in the screw member are three in number, spaced at 120° intervals about the screw's axis, and a like number of grooves, similarly spaced, in the nut's collar, and wherein the return duct from a first groove in the nut's collar is formed as an axially directed bore located radially outwardly of the several grooves, and joined to the entrance of a second groove, and wherein each successive return duct is similarly formed, located, and joined to the entrance of the next groove in succession.

References Cited in the file of this patent

UNITED STATES PATENTS 2,267,524      Hawkins _____ Dec. 23, 1941